United States Patent
Matsuda et al.

(10) Patent No.: US 7,221,792 B2
(45) Date of Patent: May 22, 2007

(54) IMAGE PROCESSING SYSTEM, PROJECTOR, IMAGE PROCESSING METHOD, AND INFORMATION STORAGE MEDIUM

(75) Inventors: Hideki Matsuda, Fujimi-machi (JP); Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 854 days.

(21) Appl. No.: 10/438,849

(22) Filed: May 16, 2003

(65) Prior Publication Data

US 2003/0234785 A1    Dec. 25, 2003

(30) Foreign Application Priority Data

May 20, 2002   (JP)   ............... 2002-144669

(51) Int. Cl.
   *G06K 9/00*   (2006.01)
(52) U.S. Cl. .................................... 382/167
(58) Field of Classification Search ............ 382/162, 382/167, 274; 345/589, 690
   See application file for complete search history.

(56) References Cited

U.S. PATENT DOCUMENTS

| | | | |
|---|---|---|---|
| 5,561,459 A | 10/1996 | Stokes et al. | |
| 5,642,172 A | 6/1997 | Yoon et al. | |
| 5,739,809 A | 4/1998 | McLaughlin et al. | |
| 6,118,455 A | 9/2000 | Hidaka et al. | |
| 6,292,228 B1 | 9/2001 | Cho | |
| 6,927,784 B2 * | 8/2005 | Matsuda et al. | ............ 345/690 |
| 2002/0089611 A1 | 7/2002 | Kim | |
| 2002/0153472 A1 | 10/2002 | Yano | |
| 2003/0179211 A1 | 9/2003 | Wada et al. | |
| 2004/0001185 A1 | 1/2004 | Wada | |
| 2004/0021672 A1 | 2/2004 | Wada et al. | |

FOREIGN PATENT DOCUMENTS

| | | |
|---|---|---|
| EP | 1 178 672 A2 | 2/2002 |
| EP | 1 189 458 A2 | 3/2002 |
| GB | 2 335 326 A | 9/1999 |
| JP | A 9-37091 | 2/1997 |
| JP | A 2002-281520 | 9/2002 |
| JP | A 2002-311503 | 10/2002 |

OTHER PUBLICATIONS

U.S. Appl. No. 10/343,429, filed Jan. 31, 2003, Matsuda et al.

* cited by examiner

*Primary Examiner*—Phuoc Tran
(74) *Attorney, Agent, or Firm*—Oliff & Berridge, PLC

(57) ABSTRACT

In order to provide an image processing system and the like which can reduce calibration time, the image processing system comprises: a device profile storage section which stores ideal-environment-measurement data; a light separating section which derives output light data indicating output light from an image projecting section and ambient light data based on a difference between first and second viewing-environment-measurement data measured through a sensor, a projection-plane-reflectance estimating section which estimates a reflectance of a projection plane, based on the output light data and the ideal environment-measurement data; a sensing data generating section which generates viewing-environment-estimation data based on the reflectance, the ideal-environment-measurement data and the ambient light data; an LUT generating section which updates an LUT based on the viewing-environment-estimation data; and a correcting section which corrects image information based on the updated LUT.

18 Claims, 5 Drawing Sheets

IMAGE PROCESSING SYSTEM, PROJECTOR, IMAGE PROCESSING METHOD, AND INFORMATION STORAGE MEDIUM

Japanese patent application No. 2002-144669 filed on May 20, 2002 is hereby incorporated by reference in its entirety.

BACKGROUND OF THE INVENTION

The present invention relates to an image processing system, a projector, a program, an information storage medium, and an image processing method which can correct image information in consideration of the influence of ambient light and projection plane.

When an image is subjected to the effect of ambient light (illuminating light or sunlight, or the like) or projection plane, the color and/or brightness thereof may be varied. Thus, the image appearance may be different from the intention of a person who has produced it.

In order to regulate such an image appearance, a projector or the like has been designed to display an image by displaying each of single-colored (e.g., black-, red-, blue- and white-colored) calibration images for a predetermined gray scale (e.g., 16-level gray scale), measuring each of the displayed calibration images, correcting a lookup table or the like based on the measured data and using the corrected lookup table to correct the image information (e.g., R-, G- and B-signals) used to display the image.

For example, Japanese Patent Application Laid-Open No. 9-37091 discloses a system which measures the color of an illuminating light and R-, G- and B-colors while stepwise changing the light-emitting level, as shown in FIG. 3 thereof.

Thus, the conventional art required much time to perform the calibration since a number of calibration images had to be displayed and measured.

As a result, much time was required to initiate the calibration, for example. when a presenter is to make a presentation before the customer to which he went. The time to be primarily applied to the presentation may be reduced.

Particularly, the projector or the like must correct an image projected onto a projection plane such as a screen or the like in consideration of not only the ambient light, but also the influence of the projection plane.

BRIEF SUMMARY OF THE INVENTION

The present invention is made in view of the above-mentioned problem and may provide an image processing systems a projector, a program, an information storage medium and an image processing method which can more reduce time required to perform the calibration for displaying the ideal image on the projection plane.

To this end, according to the first aspect of the present invention, there is provided an image processing system and a projector, comprising:

image projection means for projecting an image onto a projection plane;

a sensor which images a display region within the projection plane;

storage means for storing ideal-environment-measurement data obtained by measuring the display region on which a plurality of calibration images are sequentially displayed under an ideal environment, each of the calibration images having a different color, the display region being measured for each of the calibration images through the sensor;

light separating means for deriving output light data indicating output light outputted from the image projection means and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

projection-plane-influence-degree estimating means for estimating an influence degree due to the projection plane based on the output light data and the ideal-environment-measurement data;

sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and correcting means for updating a predetermined image correcting data based on the viewing-environment-estimation data, and also for correcting image information based on the updated image correcting data, so as to reproduce an ideal image appearance, wherein the image projection means projects an image onto the projection plane based on the image information corrected by the correcting means.

According to the second aspect of the present invention, there is provided an image processing system and a projector; comprising:

an image projection section which projects an image onto a projection plane;

a sensor which images a display region within the projection plane;

a storage section which stores ideal-environment-measurement data obtained by measuring the display region on which a plurality of calibration images are sequentially displayed under an ideal environment, each of the calibration images having a different color, the display region being measured for each of the calibration images through the sensor, a light separating section which derives output light data indicating output light outputted from the image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the ment through the sensor, luminance represented by image signals of the second calibration image being different from luminance represented by image signals of the first calibration image;

a projection-plane-influence-degree estimating section which estimates an influence degree due to the projection plane, based on the output light data and the ideal-environment-measurement data;

a sensing data generating section which generates viewing-environment-estimation data indicating an estimation value in a case of measuring the display region on which the calibration images are sequentially displayed under the viewing environment for each of the calibration images through the sensor, based on the influence degree, the ideal environment-measurement data, and the ambient light data; and a correcting section which updates a predetermined image correcting data based on the viewing-environment-estimation data, and also for correcting image information based on the updated image correcting data, so as to reproduce an ideal image appearance, wherein the image projection section projects an image onto the projection plane based on the image information corrected by the correcting section.

According to the third aspect of the present invention, there is provided a computer-readable program for causing a computer to function as:

storage means for storing ideal-environment-measurement data obtained by measuring the display region on which a plurality of calibration images are sequentially displayed under an ideal environment, each of the calibration images having a different color, the display region being measured for each of the calibration images through a predetermined sensor;

light separating means for deriving output light data indicating output light outputted from an image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

projection-plane-influence-degree estimating means for estimating an influence degree due to the projection plane, based on the output light data and the ideal-environment-measurement data;

sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and correcting means for updating a predetermined image correcting data based on the viewing-environment-estimation data, and also for correcting image information based on the updated image correcting data, so as to reproduce an ideal image appearance, wherein the image projection section projects an image onto the projection plane based on the image information corrected by the correcting means.

According to the fourth aspect of the present invention, there is provided an information storage medium storing a computer-readable program for causing a computer to function as:

storage means for storing ideal-environment-measurement data obtained by measuring the display region on which a plurality of calibration images are sequentially displayed under an ideal environment, each of the calibration images having a different color, the display region being measured for each of the calibration images through a predetermined sensor;

light separating means for deriving output light data indicating output light outputted from an image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

projection-plane-influence-degree estimating means for estimating an influence degree due to the projection plane, based on the output light data and the ideal-environment-measurement data;

sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and correcting means for updating a predetermined image correcting data based on the viewing-environment-estimation data, and also for correcting image information based on the updated image correcting data, so as to reproduce an ideal image appearance, wherein the image projection section projects an image onto the projection plane based on the image information corrected by the correcting means.

According to the fifth aspect of the present invention, there is provided an image processing method of correcting image information to be inputted so as to reproduce an ideal image appearance, comprising:

generating ideal-environment-measurement data by measuring a display region on which a plurality of calibration images are sequentially displayed under an ideal environment, each of the calibration images having a different color, the display region being measured for each of the calibration images through a predetermined sensor;

generating first viewing-environment-measurement data by measuring the display region on which a first calibration image among the calibration images is displayed under a viewing environment through the sensor;

generating second viewing-environment-measurement data by measuring the display region on which a second calibration image among the calibration images is displayed under the viewing environment through the sensor, luminance represented by image signals of the second calibration image being different from luminance represented by image signals of the first calibration image;

deriving output light data indicting output light outputted from an image projection section and ambient light data indicating ambient light under the viewing environment, based on a difference between the first and the second viewing-environment-measurement data;

estimating an influence degree due to the projection plane based on the output light data and the ideal-environment-measurement data;

generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data;

updating predetermined image correcting data based on the viewing-environment-estimation data;

correcting the image information based on the updated image correcting data; and projecting an image onto the projection plane based on the corrected image information.

According to these aspect of the present invention, the image processing system and the like can perform calibration by displaying and measuring two kinds of calibration images under the viewing environment to generate the estimation data.

Thus, the image processing system and the like can reduce calibration time, since it is not necessary to display and measure various types of calibration images like in the conventional arts.

Calibration time can be reduced, even when the projection plane is variable depending on the environment to which the image processing system and the like are applied, since the image processing system and the like particularly consider the influence degree due to the projection plane.

The influence degree may include, for example, a reflectance, a transmittance, a spectral reflectance, a spectral transmittance, a brightness ratio, or the like.

In the image processing system, the projector, the program and the information storage medium, the ideal-environment-measurement data and the output light data may be represented by XYZ tristimulus values, the projection-plane-influence-degree estimating means may estimate a reflectance of the projection plane based on a ratio between each of X-, Y- and Z-values in the ideal-environment-measurement data relating to the first or second calibration image and each of X-, Y- and Z-values in the output light data relating to the first or second calibration image, and the sensing data generating means may generate the viewing-environment estimation data based on a value obtained by multiplying each of X-, Y- and Z-values in the ideal-environment-measurement data relating to each of the calibration images by the reflectance.

In the image processing method, furthermore, the ideal-environment-measurement data and the output light data may be represented by XYZ tristimulus values, the method may further comprise:

estimating a reflectance of the projection plane based on a ratio between each of X-, Y- and Z-values in the ideal-environment-measurement data relating to the fist or second calibration image and each of X-, Y- and Z-values in the output light data relating to the first or second calibration image when the influence degree due to the projection plane is to be estimated; and generating the viewing-environment-estimation data based on a value obtained by multiplying each of X-, Y- and Z-values in the ideal-environment-measurement data relating to each of the calibration images by the reflectance.

Thus, the image processing system and the like can perform calibration based on the estimated reflectance of the projection plane, even when the projection plane is variable depending on the applied environment. The X-, Y- and Z-values used herein are device independent colors which are based on the International Standard defined by the International Commission on Illumination (CIE).

In the image processing system, the projector, the program and the information storage medium, the projection-plane-influence-degree estimating means may estimate a reflectance for each of R-, G- and B-colors based on the ideal-environment-measurement data and the output light data, and the sensing data generating means may generate the viewing-environment-estimation data based on the reflectance for each of the R-, G- and B-colors and each of R-, G- and B-values inputted as the image information.

The image processing method may further comprise:

estimating a reflectance for each of R-, G- and B-colors based on the ideal-environment-measurement data and the output light data when the influence degree due to the projection plane is to be estimated; and generating the viewing-environment-estimation data based on the reflectance for each of the R-, G- and B-colors and each of the R-, G- and B-values inputted as the image information.

Thus, the image processing system and the like can generate the viewing-environment-estimation data based on the estimated reflectance for each of the R-, G- and B-colors, even when the projection plane is variable depending on the applied environment.

In the image processing system, the projector, the program and the information storage medium, the sensing data generating means may generate darkroom-condition-estimation data indicating an estimation value in a case of measuring the display region on which the calibration images are sequentially displayed under a darkroom condition for each of the calibration images through the sensor based on the influence degree and the ideal-environment-measurement data, and may also generate the viewing-environment-estimation data based on the darkroom-condition-estimation data and the ambient light data.

The image processing method may further comprise:

generating darkroom-condition-estimation data indicating an estimation value in a case of measuring the display region on which the calibration images are sequentially displayed under a darkroom condition for each of the calibration images through the sensor based on the influence degree and the ideal-environment-measurement data, and also generating the viewing-environment-estimation data based on the darkroom-condition-estimation data and the ambient light data.

In the image processing system, the projector, the program and the information storage medium, the ambient light data, the darkroom-condition-estimation data and the viewing-environment-estimation data may be represented by XYZ tristimulus values, the sensing data generating means may generate darkroom-condition-estimation data indicating an estimation value in a case of measuring the display region on which the calibration images are sequentially displayed under a darkroom condition for each of the calibration images through the sensor, and may also generate the viewing-environment-estimation data by adding each of X-, Y- and Z-values in the ambient light data to each of X-, Y- and Z-values in the darkroom-condition estimation data.

In the image processing method, the ambient light data, the darkroom-condition-estimation data and the viewing-environment-estimation data may be represented by XYZ tristimulus values, and the method may comprise generating the viewing-environment-estimation data by adding each of X-, Y- and Z-values in the ambient light data to each of X-, Y- and Z-values in the darkroom-condition-estimation data.

With this configuration, the image processing system and the like can generate viewing-environment-estimation data by adding each of X-, Y- and Z-values in ambient light data to each of X-, Y- and Z-values in darkroom-condition-estimation data.

As a result, the image processing system and the like can perform calibration in a reduced time period.

In the image processing system, the projector, the program, the information storage medium, and the image processing method, the first and second calibration images may be white- and gray-colored calibration images or white- and black-colored calibration images.

By using white-colored calibration image, and gray- or black-colored calibration image which is different in gray scale value from the white-colored calibration image, the influence due to the projection plane can more accurately be estimated to perform a more accurate calibration, than in a case of using a calibration image of any other color such as red-color.

In the image processing system, the projector, the program, the information storage medium, the image processing method, data obtained by measuring the display region on which no image is displayed under the ideal environment through the sensor may be used as part of the ideal-environment-measurement data.

In the image processing system, the projector, the program, the information storage medium, and the image processing method, data obtained by measuring the display region on which no image is displayed under the viewing environment through the sensor may be used in place of the first or second viewing-environment-measurement data.

DETAILED DESCRIPTION OF THE EMBODIMENT

Figure 1:
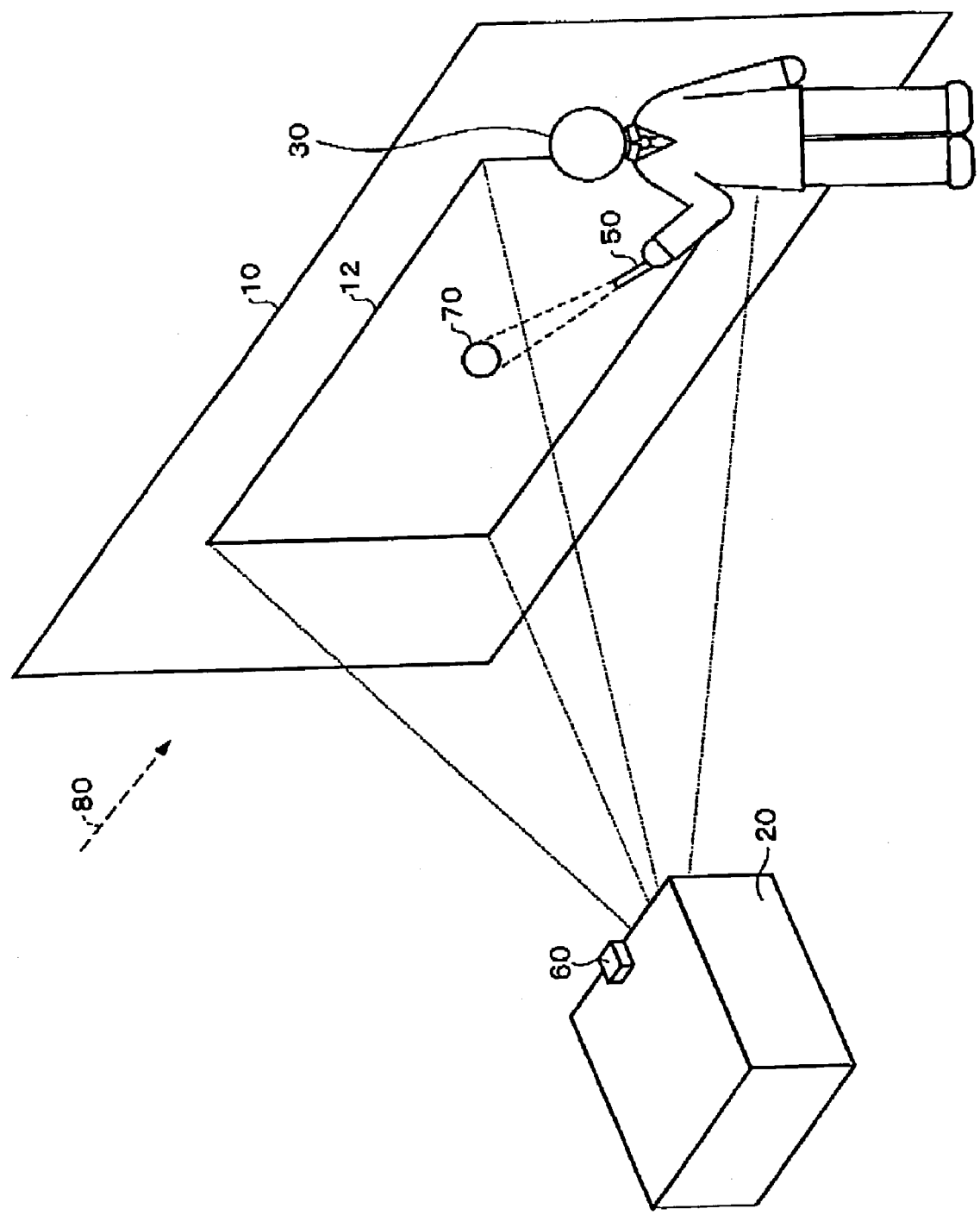
FIG. 1 is a schematic illustration of a projector according to one example of an embodiment of the present invention.

The present invention will now be described in connection with an image processing system using a liquid crystal projector with reference to the drawing. An embodiment shown in the following is not intended to limit the subject matter of the invention as described in the accompanying claims. All the components shown in such an embodiment are not necessarily essential for practicing the invention defined by the accompanying claims.

Entire System

FIG. 1 is a schematic illustration of a projector according to one example of an embodiment of the present invention.

A projector 20, which is a kind of projection type display device placed substantially in the front of a screen or projection platen 10, projects calibration and presentation images onto the screen.

A presenter 30 performs a presentation to the third person(s) while pointing a desired location on an image in an image display region 12 which is a display region on the screen 10, using a spot light 70 projected from a laser pointer 50.

When such a presentation is performed, the image appearance in the image display region 12 will greatly be varied depending on the type of the screen 10 and the ambient light 80.

For example, the same white color projected from the projector 20 may look yellowish or tin white color, depending on the type of the screen 10. Furthermore, the same white color projected from the projector 20 may look lighter or darker, depending on the ambient light 80.

The ambient light 80 may actually include, for example, illuminating lights from fluorescent lamps or external light (sunlight).

In recent years, the projector 20 is increasingly miniaturized and thus is easy for carrying around. Thus, a portable projector may frequently be carried to the customer for presentation. However, it is difficult to pre-adjust the color for the environment in the customer. Therefore, the color in the projector will generally manually be adjusted in the front of the customer. This requires too much time.

This is because the conventional art projectors have performed the display and measurement of calibration images while stepwise changing the gray scale value or input signal value, for each of the R-, G- and B-colors under the viewing environment.

The viewing environment is one in which the ambient light 80 and screen 10 exist. In other words, the viewing environment is intended to mean a standard environment (or an environment using a standard screen under a darkroom condition) to which the influences of the ambient light 80 and screen 10 other than the standard screen are added. The image appearance under the viewing environment is variable depending on the types of the ambient light 80 and screen 10.

On the contrary, the darkroom condition is intended to mean an environment in which only the screen 10 exists without the ambient light 80. Ideal environment is further intended to mean an environment in which an image is projected onto a standard screen supposed to provide the ideal environment in place of the screen 10 without the ambient light 80.

In this embodiment, the projector 20 is designed to project an image by pre-measuring a plurality of colored calibration images under the ideal environment through a sensor 60 which can derive X-, Y- and Z-values (tristimulus values) with these measured values having previously been stored as ideal-environment-measurement data; displaying two types of white-color (or other color) calibration images different in brightness (gray scale value) from each other under the viewing environment and updating image correcting data based on the first and second viewing-environment-measurement data obtained by measuring the image through the sensor 60 in consideration of the influence degree due to the reflectance or the like on the screen 10. The X-, Y- and Z-values used herein are device independent colors which are based on the International Standard defined by the International Commission on Illumination (CIE).

This embodiment can shorten the calibration time since the projector 20 uses only two kinds of calibration image under the viewing environment.

Functional Blocks

Functional blocks in an image processing system of the projector 20 for realizing the aforementioned functions will be described.

Figure 2:
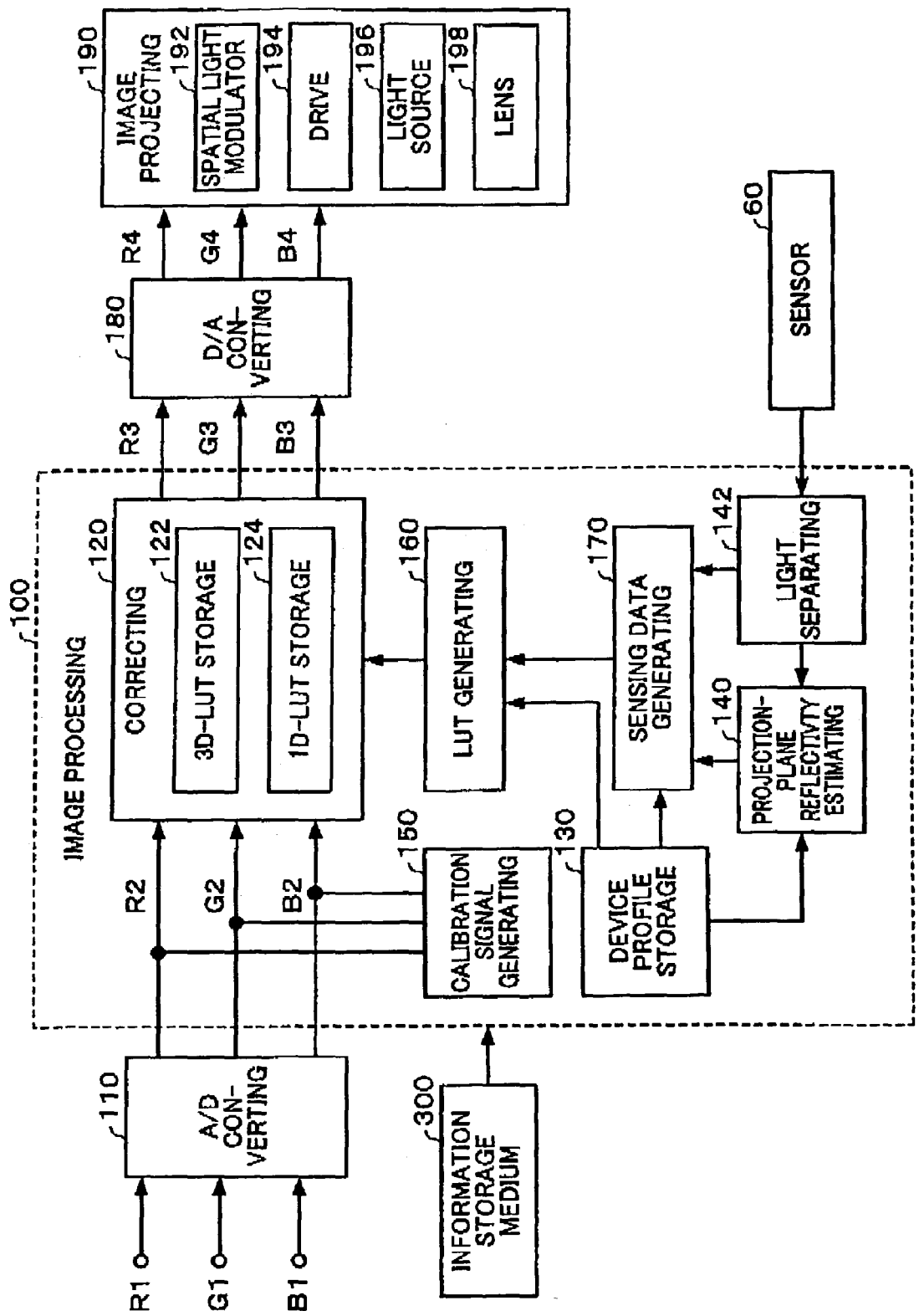
FIG. 2 is a functional block diagram of an image processing system in a projector according to one example of an embodiment of the present invention.

FIG. 2 is a functional block diagram of an image processing system in the projector 20 according to one example of an embodiment of the present invention.

The projector 20 comprises an image processing section 100, an A/D converting section 110, a D/A converting section 180 and an image projecting section 190.

The A/D converting section 110 and D/A converting section 180 are unnecessary if only digital type R-, G- and B-signals are used in the image processing system.

The A/D converting section 110 converts R1-, G1- and B1-signals constituting analog R-, G- and B-signals which are a kind of input image information from PC (Personal Computer) or the like into digital R2-, G2- and B2-signals.

The image processing section 100 comprises a correcting section 120 for correcting image information (R2-, (G2- and B2-signals) using a one-dimensional lookup table 1D-LUT and a three-dimensional lookup table 3D-LUT with the corrected image information being then output as other image information (R3-, G3- and B3-signals); a calibration signal generating section 150; a light separating section 142; a projection-plane-reflectance estimating section 140; a sensing data generating section 170; an LUT generating section 160; and a device profile storage section 130.

1D-LUT and 3D-LUT are a kind of image correcting data. The image correcting data may be a color transforming matrix in place of 3D-LUT.

The calibration signal generating section 150 generates digital R2-, G2- and B2-signals used to display calibration images.

In such a manner, the projector 20 can solely perform the calibration without need of calibration signals inputted from any external input device such as PC or the like into the projector 20 since the calibration image signals are generated within the projector 20. The calibration image signals may be inputted from PC or the like directly into the projector 20 without use of the calibration signal generating section 150.

The correcting section 120 functioning as part of a correcting means comprises a 3D-LUT storage section 122 stored 3D-LUT for correcting the color (or hue) of an image and a 1D-LUT storage section 124 stored 1D-LUT for correcting the brightness (or gray scale) of the image.

The light separating section 142 derives output light data indicating output light outputted from the image projecting section under the darkroom condition and ambient light data indicating the ambient light 80 under the viewing environment, respectively, based on the difference between the first viewing-environment-measurement data obtained by measuring one of the display regions on which the first calibration image having the highest white-color gray scale is displayed under the viewing environment through the sensor 60 and the second viewing-environment-measurement data obtained by measuring another of the display regions on which the second calibration images having its lower gray scale (gray-color) than that of the first calibration image is displayed under the viewing environment through the sensor 60.

The projection-plane-influence-degree estimating section 140 estimates the reflectance in the screen 10, based on a ratio between each of the X-, Y- and Z-values in the ideal-environment-measurement data relating to the first or second calibration image and the corresponding one of the X-, Y- and Z-values in the output light data relating to the first or second calibration image.

The term "ideal-environment-measurement data" used herein is intended to mean data which is obtained by projecting and measuring a plurality of colored (e.g., white-, red-, green-, blue-, gray- and black-colored) calibration images onto an ideal projection plane and through the sensor 60 without influence of the ambient light 80.

In this embodiment, the ideal-environment-measurement data may be a device profile stored in a device profile storage section 130. More specifically, the device profile storage section 130 functions as memory means for storing the ideal-environment-measurement data.

The sensing data generating section 170, which functions as part of the correcting means, generates darkroom-conditions-estimation data by multiplying each of the X-, Y- and Z-values in the ideal-environment-measurement data for each calibration image with the reflectance in the screen 10.

The sensing data generating section 170 also generates viewing-environment-estimation data by adding each of the X-, Y- and Z-values in the darkroom-condition-estimation data with the corresponding one of the X-, Y- and Z-values in the ambient light data from the light separating section 142.

The LUT generating section 160 generates 3D-LUT and 1D-LUT based on the viewing-environment-estimation data from the sensing data generating section 170, the generated 3D-LUT and 1D-LUT being then stored in the 3D-LUT and 1D-LUT storage sections 122, 124, respectively.

The LUT generating section 160 may use the ideal-environment-measurement data stored in the device profile storage section 130 when it is to generate 3D-LUT and 1D-LUT.

The D/A converting section 180 converts the R3-, G3- and B3-signals from the correcting section 120 into analog R4-, G4- and B4-signals.

The image projecting section 190 comprises a spatial light modulator 192, a drive section 194 for driving the spatial light modulator 192 based on the R4, G4 and B4 signals from the D/A converting section 180, a light source 196 for outputting a light toward the spatial light modulator 192 and a lens 198 for projecting the light after it has been modulated at the spatial light modulator 192.

Flow of Image Processing

A flow of image processing with the use of these sections will be explained in connection with a flow chart.

Figure 3:
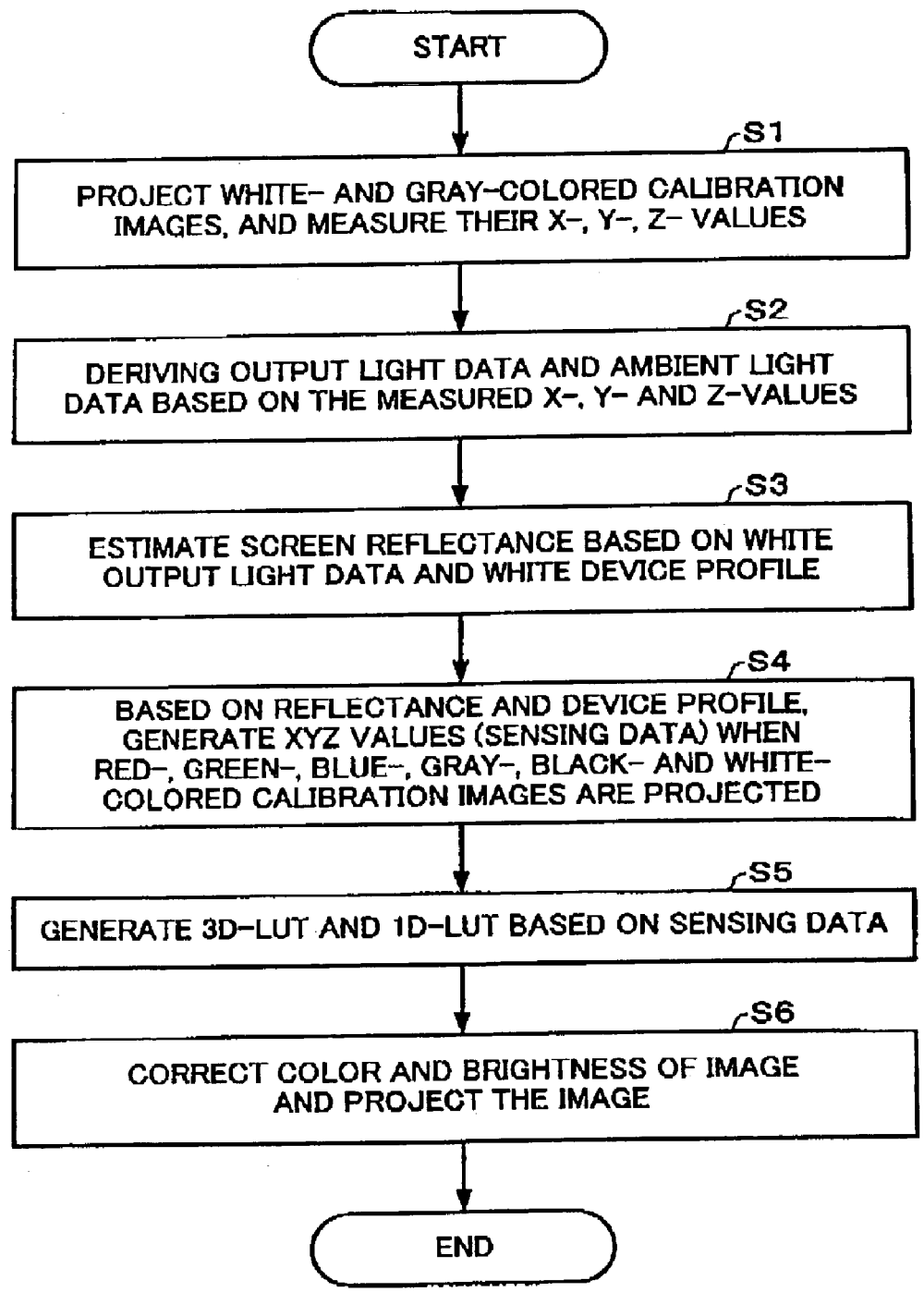
FIG. 3 is a flow chart illustrating an image processing procedure according to one example of an embodiment of the present invention.

FIG. 3 is a flow chart illustrating an image processing procedure according to one example of an embodiment of the present invention.

First of all, the projector 20 functions to sequentially project single-colored calibration images, each of which is white-, red-, green-, gray- and black-colored, onto a standard screen (or a screen providing a criterion of measurement) under the ideal environment and to measure each of the projected calibration images through the sensor 60, with the ideal-environment-measurement data indicating the respective X-, Y- and Z-values being then stored in the device profile storage section 130 as device profiles. Such a work has been done, for example, before product shipment of projector 20.

The order of the calibration images to be displayed may be set voluntarily.

In this embodiment, each of the single-colored calibration images which is white-, red-, green-, gray- and black-colored, represents an image when the respective R2-, G2- and B2-signals meet the following conditions:
  White: (R2, G2, B2)=(255, 255, 255);
  Red: (R2, G2, B2)=(255, zero, zero);
  Green: (R2, G2, B2)=(zero, 255, zero);
  Blue: (R2, G2, B2)=(zero, zero, 255);
  Gray: (R2, G2, B2)=(100, 100, 100); and
  Black; (R2, G2, B2)=(zero, zero, zero)

In other words, the device profile indicates the relationship between R-, G- and B-signal values inputted relating to a certain display device and X-, Y- and Z-values of a color which is reproduced on the standard screen based on these R-, G- and B-signal values.

More particularly, it is now assumed that this device profile includes white X-, Y- and Z-values (Xdw, Ydw and Zdw), red X-, Y- and Z-values (Xdr, Ydr and Zdr), green X-, Y- and Z-values (Xdgr, Ydgr and Zdgr), blue X-, Y- and Z-values (Xdb, Ydb and Zdb), gray X-, Y- and Z-values (Xdg, Ydg and Zdg) and black X-, Y- and Z-values (Xdk, Ydk and ZdK). Under an environment where the projector 20 is actually used, that is, viewing environment, the projector 20 sequentially projects the white-colored calibration image and the gray-colored calibration image having its lower gray scale than that of the white-colored calibration image onto the screen 10.

The sensor 60 then measures the first viewing-environment-measurement data (Xsw, Ysw, Zsw) indicating the X-, Y- and Z-values of the white-colored calibration image and the second viewing-environment-measurement data (Xsgr, Ysgr, Zsgr) indicating the X-, Y- and Z-values of the gray-colored calibration image, with the measured values being then output toward the light separating section 142 (step S1).

The light separating section 142 then computes the difference (Xsw−Xsgr, Ysw−Ysgr, Zsw−Zsgr) between the first viewing-environment-measurement data and the second viewing-environment-measurement data.

The light separating section 142 also derives output light data (Xpw, Ypw, Zpw) indicating output light outputted from the projector 20 under the darkroom condition and ambient light data (Xak, Yak, Zak) indicating the ambient light 80 under the viewing environment, respectively (step S2). The output light data corresponds to data provided when the components of the ambient light 80 are subtracted from the X-, Y- and Z-values of the white-colored calibration image measured under the viewing environment.

More particularly, the light separating section 142 determines the output light data by performing the following computations: Xpw=(Xsw−Xsgr)·Xdw/(Xdw−Xdgr); Ypw=(Ysw−Ysgr)·Ydw/(Ydw−Ydgr); and Zpw=(Zsw−Zsgr)·Zdw/(Zdw−Zdgr).

The light separating section 142 also determines the ambient light data by carrying out the following computations: Xak=Xsw−Xpw; Yak=Ysw−Ypw, and Zak=Zsw−Zpw.

The projection-plane-reflectance estimating section 140 estimates the reflectance on the screen 10, based on the output light data and device profile (Xdw, Ydw, Zdw) for white-color (step S3).

More particularly, the projection-plane-reflectance estimating section 140 computes: Xpw/Xdw; Ypw/Ydw; and Zpw/Zdw, each of which indicates the reflectance for each of the X-, Y- and Z-values.

The sensing data generating section 170 generates the X-, Y- and Z-values of the projected red-, green-, blue-, gray-, black- and white-colored calibration images (or sensing data), based on the estimated reflectance from the projection-plane-reflectance estimating section 140 and the device profiles stored in the device profile storage section 130 (step S4).

More particularly, the sensing data generating section 170 generates the darkroom-condition-estimation data that is part of the sensing data by computing: Xdr·Xpw/Xdw, Ydr·Ypw/Ydw, and Zdr·Zpw/Zdw as X-, Y- and Z-values for red-color; Xdg·Xpw/Xdw, Ydg·Ypw/Ydw and Zdg·Zpw/Zdw as X-, Y- and Z-values for green-color; Xdb·Xpw/Xdw, Ydb·Ypw/Ydw and Zdb·Zpw/Zdw as X-, Y- and Z-values for blue-color, Xdgr·Xpw/Xdw, Ydgr·Ypw/Ydw and Zdgr·Zpw/Zdw as X-, Y- and Z-values for gray-color; and Xdk·Xpw/Xdw, Ydk·Ypw/Ydw and ZdK·Zpw/Zdw as X-, Y- and Z-values for black-color, and by using Xpw, Ypw and Zpw as X-, Y- and Z-values for white-color.

In other words, the white color is directly the white-colored output light data since it will not be influenced by the ambient light 80 while the other colors than the white color each have a value obtained by multiplying the estimated reflectance with the X-, Y- and Z-values of the corresponding device profile.

When the sensing data generating section 170 is to generate the viewing-environment-estimation data which is part of the sensing data, this viewing-environment-estimation data is in the form of a value obtained by adding one of the X-, Y- and Z-values in the ambient light data to the corresponding one of the X-, Y- and Z-values in the darkroom-condition estimation data.

More particularly, the white X-value in the view-environment-estimation data may be Xpw+Xak while the red X-value in the viewing-environment-estimation data may be Xdr·Xpw/Xdw+Xak. Y- and Z-values can be determined through the computation similar to that of the X-value while the X-, Y- and Z-values of green color can be determined through the computation similar to that of the red-color.

The LUT generating section 160 generates 3D-LUT and 1D-LUT which are a kind of image correcting data, based on the generated data (or viewing-environment-estimation data) from the sensing data generating section 170, with the generated 3D-LUT and 1D-LUT being then stored in the 3D-LUT and 1D-LUT storage sections 122, 124, respectively (step S5). In this case, the LUT generating section 160 may generate 3D-LUT and 1D-LUT while making reference to the sensing data (or viewing-environment-estimation data) as well as a target profile (not shown), if necessary. The term "target profile" used herein is intended to mean data indicating the target color of sRGB or the like.

The correcting section 120 corrects the image information to correct the image color, based on 3D-LUT store in the 3D-LUT storage section 122, and also corrects the image information to correct the image brightness, based on 1D-LUT store in the 1D-LUT storage section 124, with the corrected image information (R3, G3, B3) being then output toward the D/A converting section 180.

The drive section 194 in the image projecting section 190 drives the spatial light modulator 192, based on the image information (R4, G4, B4) which has been converted into analog signals at the D/A converting section 180. The spatial light modulator 192 modulates the light from the light source 196 into a light to be projected which is in turn output through the lens 198.

Thus, the projector 20 corrects the presentation images relating to their color and brightness by use of correcting section 120, with the corrected presentation images being then projected through the image projecting section 190 (step S6).

According to this embodiment, therefore, the projector 20 can carry out the calibration by performing the measurement and display for two kinds of calibration images under the viewing environment to generate the estimation data.

As a result, the calibration time can be shortened since the repeated display and measurement for various types of calibration images as in the conventional art are not required.

This embodiment can further shorten the calibration time even if the property of the screen 10 is variable depending on the environment to which the projector 20 is applied, since it particularly considers the influence degree due to the screen 10.

According to this embodiment, the projector 20 may generate the viewing-environment-estimation data by adding each of the X-, Y- and Z-values in the ambient light data to the corresponding one of the X-, Y- and Z-values in the darkroom-condition-estimation data.

As a result, the projector 20 can more shorten the calibration time.

Hardware

For example, the following things can be applied to the respective hardware parts above mentioned.

Figure 5:
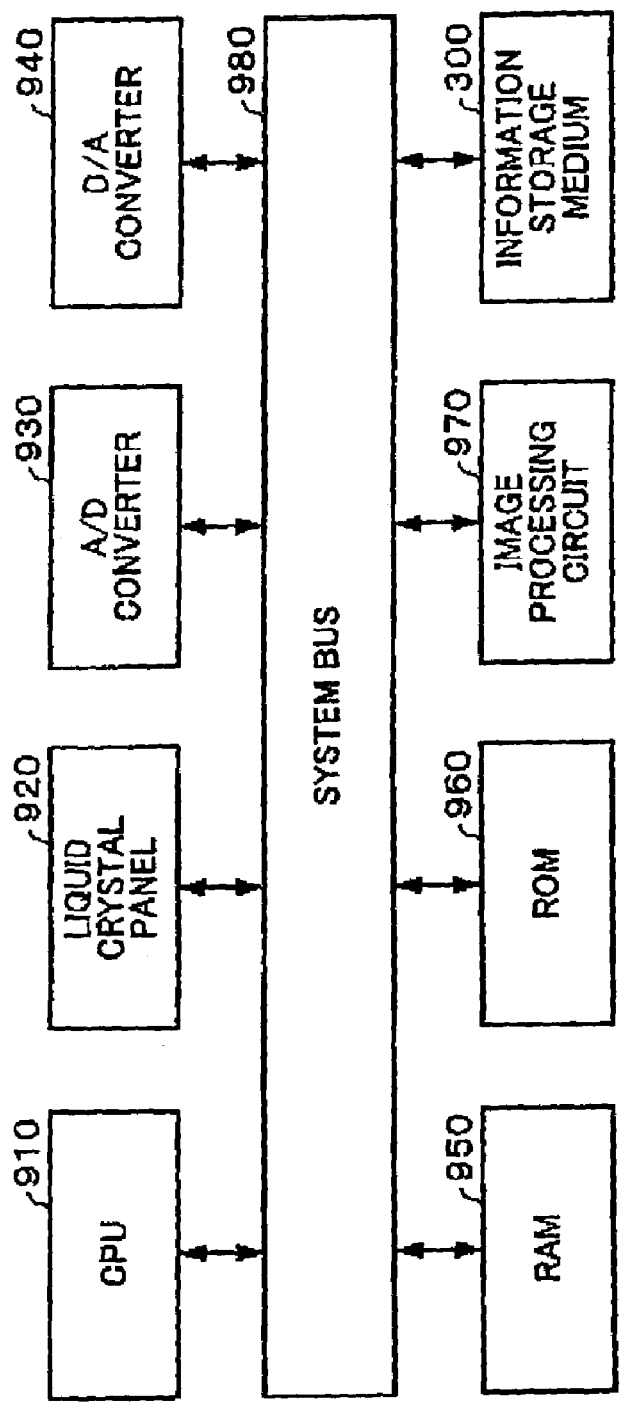
FIG. 5 is a hardware block diagram illustrating an image processing system in a projector according to one example of an embodiment of the present invention.

FIG. 5 is a hardware block diagram of an image processing system in the projector 20 according to one example of an embodiment of the present invention.

The A/D converting section 110 may be implemented, for example, by an A/D converter 930; the D/A converting section 180 may be implemented, for example, by a D/A converter 940; the spatial light modulator 192 may be implemented, for example, by a liquid crystal panel 920; the drive section 194 may be implemented, for example, by a ROM 960 in which a liquid crystal light valve driver has been stored; the correcting section 120, projection-plane-reflectance-estimating section 140, light separating section 142, LUT generating section 160 and sensing data generating section 170 may be implemented, for example, by an image processing circuit 970, CPU 910 and RAM 950, respectively; and the device profile storage section 130 and calibration signal generating section 150 may be implemented, for example, by an RAM 950. These sections are configured to mutually deliver the information from one to another through a system bus 980.

Moreover, the sensor 60 may be implemented by use of a sensor capable of deriving the X-, Y- and Z-values such as a brightness sensor. These sections may be implemented in a hardware manner such as circuits or in a software manner such as drivers.

Furthermore, as shown in FIG. 2, a computer included in the projector 20 may realize the functions of these sections according to a program which is read out of the information storage medium 300. The information storage medium 300 may be formed by any one of various components such as CD-ROM, DVD-ROM, ROM, RAM, HDD while the information reading mode thereof may be either of the contact or non-contact type.

The above-mentioned functions may be realized according to a program downloaded from a host device or the like through a transmission channel, rather than from the information storage medium 300.

Modified Examples

Although the preferred embodiment of the present invention has been described, the present invention may similarly be applied to any one of various other examples.

Although the embodiment has been described as to the reflectance for each of the X-, Y- and Z-values in the screen 10, the present invention can use any one of the various other kinds of data which indicate the influence degree due to the screen 10 such as reflectance for each R-, G- and B-color (which is also referred to "gain"), brightness ratio and the like.

An image processing method carried out when the reflectance for each R, G or B in the reflected light on the screen 10 under the viewing environment is used will be described below.

Figure 4:
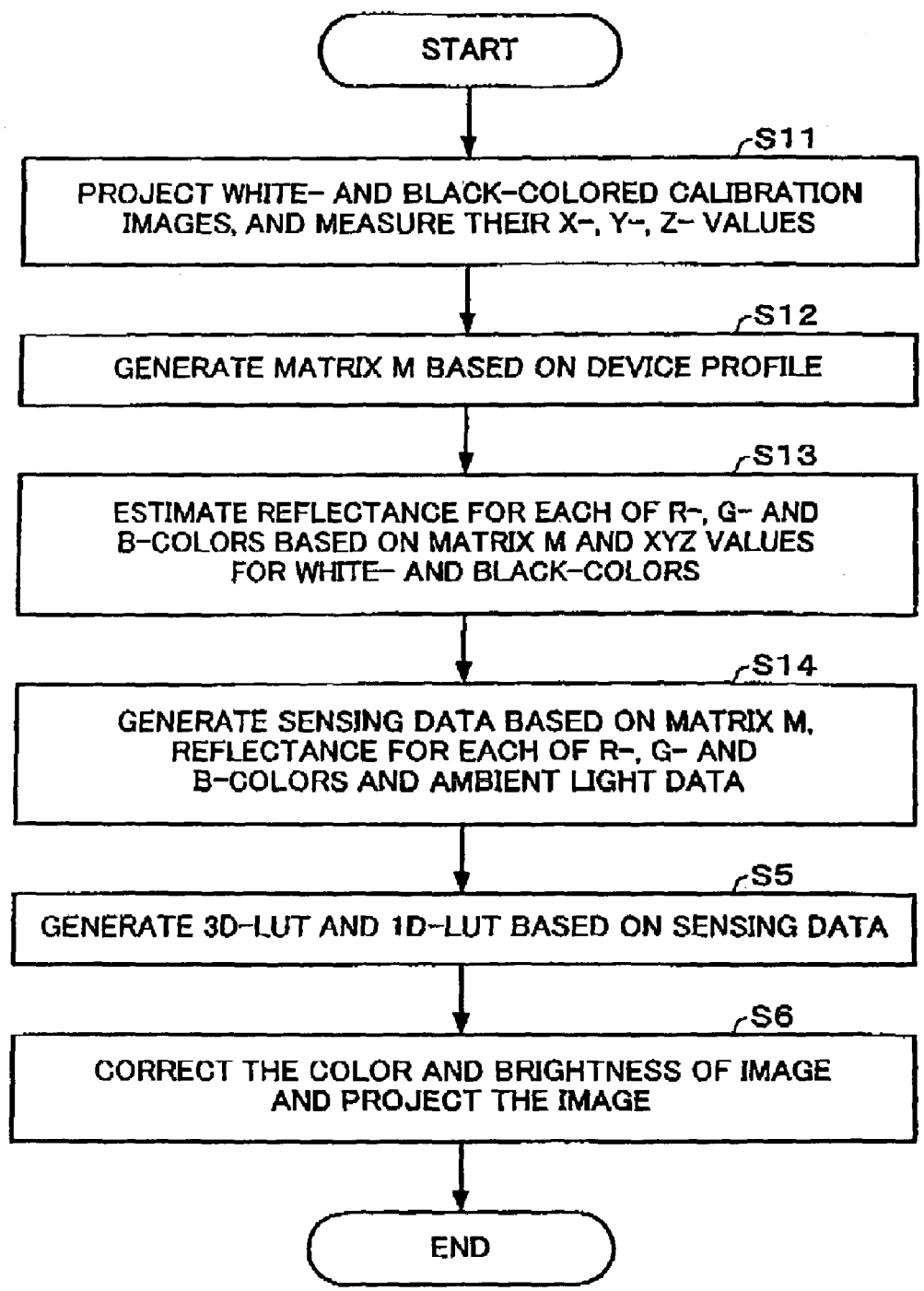
FIG. 4 is a flow chart illustrating an image processing procedure when the reflectance for each of R-, G- and B-colors is used according to one example of an embodiment of the present invention.

FIG. 4 is a flow chart illustrating an image processing procedure when the reflectance for each of R-, G- and B-colors is used according to one example of an embodiment of the present invention.

As described in connection with FIG. 3, it is now assumed that the device profiles have previously been stored in the device profile storage section 130.

Under the environment where the projector 20 is actually used, that is, the viewing environment, the projector 20 sequentially projects white- and black-colored calibration images onto the screen 10. The sensor 60 then measures the first viewing-environment-measurement data (Xsw, Ysw, Zsw) indicating the X-, Y- and Z-values of the white-colored calibration image and the second viewing-environment-measurement data (Xsk, Ysk, Zsk) indicating the X-, Y- and Z-values of the black-colored calibration image, with the measured values being then output toward the light separating section 142 (step S11).

Two gray-colored calibration images having intermediate grayscale values other than the white- and black-colored calibration images may be measured, with the measurements for white and black colors being extrapolated (or estimated) thereto.

The projection-plane-reflectance estimating section 140 generates a matrix M for transformation, based on the device profiles stored in the device profile storage section 130 (step S12).

The matrix M can be expressed by the following expression (1):

Expression (1)
$$M = \begin{bmatrix} xdr & xdg & xdb \\ ydr & ydg & ydb \\ zdr & zdg & zdb \end{bmatrix} \quad (1)$$

where xdr=Xdr/(Xdr+Ydr+Zdr) and ydr=Ydr/(Xdr+Ydr+Zdr) and wherein zdr=1−xdr−ydr. xdg and the like can be processed similar to xdr.

The light separating section 142 and projection-plane-reflectance estimating section 140 estimate the reflectance for each of the R-, G- and B-colors on the screen 10, based on the X-, Y- and Z-values for white and black colors from the sensor 60 (step S13).

More particularly, reflectances Sr, Sg and Sb for R-, G- and B-colors are determined as shown in the following expression (2).

Expression (2)
$$\begin{bmatrix} Sr \\ Sg \\ Sb \end{bmatrix} = M^{-1} = \begin{bmatrix} Xsw - Xsk \\ Ysw - Ysk \\ Zsw - Zsk \end{bmatrix} \quad (2)$$

However, the expression (2) does not consider the change of the ambient light 80 by subtracting the black-color output from the white-color output as shown by Xsw−Xsk. In this embodiment, xy chromaticity coordinate values for R-, G- and B-colors are hardly changed depending on the type of the screen 10 in comparison with xy chromaticity coordinate values for white- and other colors. In other words, it is supposed that only the brightness components will be changed depending on the type of the screen 10 by causing only the size of the spectral distribution to be changed depending on the type of the screen 10 without substantial change of the shape thereof because the primary R-, G- and B-colors are in an reduced wavelength range of spectral distribution in comparison with other mixed R-, G- and B-colors.

The sensing data generating section 170 then generates data by converting R-, G- and B- values of calibration image (R2, G2, B2) into X-, Y- and Z-values, based on the matrix M, reflectance for each of the R-, G- and B-colors and the ambient light data derived at the light separating section 142 (step S14).

More particularly, the sensing data generating section 170 converts the aforementioned R-, G- and B- values into X-, Y- and Z-values using the following expression (3):

Expression (3)
$$\begin{bmatrix} x \\ y \\ z \end{bmatrix} = M \begin{bmatrix} Sr(R/255)^\gamma \\ Sg(G/255)^\gamma \\ Sb(B/255)^\gamma \end{bmatrix} + \begin{bmatrix} Xsk \\ Ysk \\ Zsk \end{bmatrix} \quad (3)$$

If the conversion shown by the expression (3) is used, the darkroom-condition-estimation data and viewing-environment-estimation data can be determined only through the computation without projection and measurement of other colored calibration images than the white- and black-colored calibration images. When the darkroom-condition-estimation data is to be determined, a process of adding the ambient light data (Xk, Yk, Zk) in the expression (3) is not required.

For example, when the red-colored calibration image is used, the R-, G- and B-values thereof are (255, 0, 0). Thus, the X-, Y- and Z-values obtained by measuring the red-colored calibration image if these R- and B-values are input into the expression (3).

The process carried out after generation of the sensing data is as described in connection with FIG. 3. The LUT generating section 160 generates 3D-LUT and 1D-LUT, based on the sensing data (step S5). The projector 20 corrects the color and brightness of the image and projects the presentation images (step S6).

As described, the projector 20 may correct the image by displaying and measuring the white- and black-colored calibration images under the viewing environment, determining the influence degree due to the screen 10 as reflectance for each of the R-, G- and B-colors and generating the darkroom-condition-estimation data and viewing-environment-estimation data.

Although the image processing system using the reflectance for each X-, Y- or Z-value has been described as to the white- and gray-colored calibration images used under the viewing environment, any of other blue-, green-, red-colored calibration images may be used. Alternatively, a combination of two or more calibration images may be used.

If it is desired to reduce the cost of the sensor 60, the aforementioned first and second calibration images preferably have two colors approximate to each other in higher grayscale value. If it is desired to improve the sensor 60 in accuracy, it is preferred to use two colors separate from each other in gray scale.

Part of the aforementioned ideal-environment-measurement data may be data which is obtained by measuring a portion of the display region on which no image is displayed under the ideal environment through the sensor 60.

Similarly, the first or second viewing-environment-measurement data may be replaced by data obtained by measuring a portion of the display region on which no image is displayed under the viewing environment through the sensor 60.

This is because it is believed that the measurement similar to that of the no-image-display condition is provided if the projector 20 projects a single black-colored image as a calibration image, for example.

It is further preferred that the projection plane is a white-colored screen approximate to the ideal environment. However, the screen 10 may be replaced by any suitable wall surface. Even if the wall surface is used, the projector 20 according to this embodiment can adequately carry out the calibration for a shortened time period since it considers the influence due to the projection plane.

The image processing system according to this embodiment may be applied to any one of various projectors such as a projector using DMD (Digital Micromirror Device), rather than such a liquid crystal projector as the projector 20. For DMD, the spatial light modulator 192 may be formed by the combination of a color filter with a DMD chip. DMD is a trademark possessed by Texas Instruments Incorporated in the U.S. In addition, the projector is not limited to be of front projection type, but it may be of back projection type.

In addition, the present invention can effectively be used in meeting, medical care, design and fashion, business activity, commercial, education as well as any general image display such as movie, TV, video and game, in addition to the presentation.

The aforementioned function of the projector image processing system may be realized only by the projector 20 or by a plurality of distributed processing devices (e.g., the projector 20 and personal computers).

The sensor 60 may be integrated with the projector 20 or may be formed as a device separate from the projector 20.

As described, the sensor 60 may be one that can derive the X-, Y- and Z-values. Therefore, it is not required that a sensor used to generate the ideal-environment-measurement data is necessarily identical with a sensor used under the viewing environment. More particularly, for example, the X-, Y- and Z-values derived by a standard sensor on production of the projector 20 may be stored in the memory of the projector 20 as device profiles or as ideal-environment-measurement data. A sensor different from the standard sensor may be mounted in the projector 20 to be shipped and used to perform the measurement under the viewing environment.

What is claimed is:

1. An image processing system comprising:
   image projection means for projecting an image onto a projection plane;
   a sensor which images a display region within the projection plane;
   storage means for storing ideal-environment-measurement data obtained by measuring the display region on which a plurality of calibration images are sequentially displayed under an ideal environment, each of the calibration images having a different color, the display region being measured for each of the calibration images through the sensor;
   light separating means for deriving output light data indicating output light outputted from the image projection means and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;
   projection-plane-influence-degree estimating means for estimating an influence degree due to the projection plane based on the output light data and the ideal-environment-measurement data;
   sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and
   correcting means for updating a predetermined image correcting data based on the viewing-environment-estimation data, and also for correcting image information based on the updated image correcting data, so as to reproduce an ideal image appearance,
   wherein the image projection means projects an image onto the projection plane based on the image information corrected by the correcting means.

2. The image processing system as defined in claim 1,
   wherein the ideal-environment-measurement data and the output light data are represented by XYZ tristimulus values,
   wherein the projection-plane-influence-degree estimating means estimates a reflectance of the projection plane based on a ratio between each of X-, Y- and Z-values in the ideal-environment-measurement data relating to the first or second calibration image and each of X-, Y- and Z-values in the output light data relating to the first or second calibration image, and
   wherein the sensing data generating means generates the viewing-environment-estimation data based on a value obtained by multiplying each of X-, Y- and Z-values in the ideal-environment-measurement data relating to each of the calibration images by the reflectance.

3. The image processing system as defined in claim 1,
   wherein the projection-plane-influence-degree estimating means estimates a reflectance for each of R-, G- and B-colors based on the ideal-environment-measurement data and the output light data, and
   wherein the sensing data generating means generates the viewing-environment-estimation data based on the reflectance for each of the R-, G- and B-colors and each of R-, G- and B-values inputted as the image information.

4. The image processing system as defined in claim 2,
   wherein the sensing data generating means generates darkroom-condition-estimation data indicating an estimation value in a case of measuring the display region on which the calibration images are sequentially displayed under a darkroom condition for each of the calibration images through the sensor based on the influence degree and the ideal-environment-measurement data, and also generates the viewing-environment-estimation data based on the darkroom-condition-estimation data and the ambient light data.

5. The image processing system as defined in claim 4,
   wherein the ambient light data, the darkroom-condition-estimation data and the viewing-environment-estimation data are represented by XYZ tristimulus values, and
   wherein the sensing data generating means generates the viewing-environment-estimation data by adding each of X-,Y- and Z-values in the ambient light data to each of X-, Y- and Z-values in the darkroom-condition-estimation data.

6. An image processing system comprising:
   an image projection section which projects an image onto a projection plane;
   a sensor which images a display region within the projection plane;
   a storage section which stores ideal-environment-measurement data obtained by measuring the display region on which a plurality of calibration images are sequentially displayed under an ideal environment, each of the calibration images having a different color, the display region being measured for each of the calibration images through the sensor;
   a light separating section which derives output light data indicating output light outputted from the image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

a projection-plane-influence-degree estimating section which estimates an influence degree due to the projection plane, based on the output light data and the ideal-environment-measurement data;

a sensing data generating section which generates viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and a correcting section which updates a predetermined image correcting data based on the viewing-environment-estimation data, and also for correcting image information based on the updated image correcting data, so as to reproduce an ideal image appearance, wherein the image projection section projects an image onto the projection plane based on the image information corrected by the correcting section.

7. A projector comprising:

image projection means for projecting an image onto a projection plane;

a sensor which images a display region within the projection plane;

storage means for storing ideal-environment-measurement data obtained by measuring the display region on which a plurality of calibration images are sequentially displayed under an ideal environment, each of the calibration images having a different color, the display region being measured for each of the calibration images through the sensor;

light separating means for deriving output light data indicating output light outputted from the image projection means and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

projection-plane-influence-degree estimating means for estimating an influence degree due to the projection plane, based on the output light data and the ideal-environment-measurement data;

sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and correcting means for updating a predetermined image correcting data based on the viewing-environment-estimation data, and also for correcting image information based on the updated image correcting data, so as to reproduce an ideal image appearance, wherein the image projection means projects an image onto the projection plane based on the image information corrected by the correcting means.

8. A projector comprising:

an image projection section which projects an image onto a projection plane;

a sensor which images a display region within the projection plane;

a storage section which stores ideal-environment-measurement data obtained by measuring the display region on which a plurality of calibration images are sequentially displayed under an ideal environment, each of the calibration images having a different color, the display region being measured for each of the calibration images through the sensor;

a light separating section which derives output light data indicating output light outputted from the image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;

a projection-plane-influence-degree estimating section which estimates an influence degree due to the projection plane, based on the output light data and the ideal-environment-measurement data;

a sensing data generating section which generates viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and a correcting section which updates a predetermined image correcting data based on the viewing-environment-estimation data, and also for correcting image information based on the updated image correcting data, so as to reproduce an ideal image appearance, wherein the image projection section projects an image onto the projection plane based on the image information corrected by the correcting section.

9. An information storage medium storing a computer-readable program for causing a computer to function as:
storage means for storing ideal-environment-measurement data obtained by measuring the display region on which a plurality of calibration images are sequentially displayed under an ideal environment, each of the calibration images having a different color, the display region being measured for each of the calibration images through a predetermined sensor;
light separating means for deriving output light data indicating output light outputted from an image projection section and ambient light data indicating ambient light under a viewing environment based on a difference between first viewing-environment-measurement data and second viewing-environment-measurement data, the first viewing-environment-measurement data being obtained by measuring the display region on which a first calibration image among the calibration images is displayed under the viewing environment through the sensor, the second viewing-environment-measurement data being obtained by measuring the display region on which a second calibration image among the calibration images is displayed under the viewing environment through the sensor, luminance represented by image signals of the second calibration image being different from luminance represented by image signals of the first calibration image;
projection-plane-influence-degree estimating means for estimating an influence degree due to the projection plane, based on the output light data and the ideal-environment-measurement data;
sensing data generating means for generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data; and
correcting means for updating a predetermined image correcting data based on the viewing-environment-estimation data, and also for correcting image information based on the updated image correcting data, so as to reproduce an ideal image appearance,
wherein the image projection section projects an image onto the projection plane based on the image information corrected by the correcting means.

10. The information storage medium as defined in claim 9,
wherein the ideal-environment-measurement data and the output light data are represented by XYZ tristimulus values,
wherein the projection-plane-influence-degree estimating means estimates a reflectance of the projection plane based on a ratio between each of X-, Y- and Z-values in the ideal-environment-measurement data relating to the first or second calibration image and each of X-, Y- and Z-values in the output light data relating to the first or second calibration image, and
wherein the sensing data generating means generates the viewing-environment-estimation data based on a value obtained by multiplying each of X-, Y- and Z-values in the ideal-environment-measurement data relating to each of the calibration images by the reflectance.

11. The information storage medium as defined in claim 9,
wherein the projection-plane-influence-degree estimating means estimates a reflectance for each of R-, G- and B-colors based on the ideal-environment-measurement data and the output light data, and
wherein the sensing data generating means generates the viewing-environment-estimation data based on the reflectance for each of the R-, G- and B-colors and each of R-, G- and B-values inputted as the image information.

12. The information storage medium as defined in claim 10,
wherein the sensing data generating means generates darkroom-condition-estimation data indicating an estimation value in a case of measuring the display region on which the calibration images are sequentially displayed under a darkroom condition for each of the calibration images through the sensor based on the influence degree and the ideal-environment-measurement data, and also generates the viewing-environment-estimation data based on the darkroom-condition-estimation data and the ambient light data.

13. The information storage medium as defined in claim 12,
wherein the ambient light data, the darkroom-condition-estimation data and the viewing-environment-estimation data are represented by XYZ tristimulus values, and
wherein the sensing data generating means generates the viewing-environment-estimation data by adding each of X-, Y- and Z-values in the ambient light data to each of X-, Y- and Z-values in the darkroom-condition-estimation data.

14. An image processing method of correcting image information to be inputted so as to reproduce an ideal image appearance, comprising:
generating ideal-environment-measurement data by measuring a display region on which a plurality of calibration images are sequentially displayed under an ideal environment, each of the calibration images having a different color, the display region being measured for each of the calibration images through a predetermined sensor;
generating first viewing-environment-measurement data by measuring the display region on which a first calibration image among the calibration images is displayed under a viewing environment through the sensor;
generating second viewing-environment-measurement data by measuring the display region on which a second calibration image among the calibration images is displayed under the viewing environment through the sensor, luminance represented by image signals of the second calibration image being different from luminance represented by image signals of the first calibration image;
deriving output light data indicting output light outputted from an image projection section and ambient light data indicating ambient light under the viewing environment, based on a difference between the first and the second viewing-environment-measurement data;
estimating an influence degree due to the projection plane based on the output light data and the ideal-environment-measurement data;
generating viewing-environment-estimation data indicating an estimation value in a case of measuring the display region on which the calibration images are sequentially displayed under the viewing environment for each of the calibration images through the sensor, based on the influence degree, the ideal-environment-measurement data, and the ambient light data;

updating predetermined image correcting data based on the viewing-environment-estimation data;

correcting the image information based on the updated image correcting data; and projecting an image onto the projection plane based on the corrected image information.

15. The image processing method as defined in claim 14, wherein the ideal-environment-measurement data and the output light data are represented by XYZ tristimulus values, the method further comprising:

estimating a reflectance of the projection plane based on a ratio between each of X-, Y- and Z-values in the ideal-environment-measurement data relating to the first or second calibration image and each of X-, Y- and Z-values in the output light data relating to the first or second calibration image when the influence degree due to the projection plane is to be estimated; and generating the viewing-environment-estimation data based on a value obtained by multiplying each of X-, Y- and Z-values in the ideal-environment-measurement data relating to each of the calibration images by the reflectance.

16. The image processing method as defined in claim 14, further comprising:

estimating a reflectance for each of R-, G- and B-colors based on the ideal-environment-measurement data and the output light data when the influence degree due to the projection plane is to be estimated; and generating the viewing-environment-estimation data based on the reflectance for each of the R-, G- and B-colors and each of the R-, G- and B-values inputted as the image information.

17. The image processing method as defined in claim 16, further comprising:

generating darkroom-condition-estimation data indicating an estimation value in a case of measuring the display region on which the calibration images are sequentially displayed under a darkroom condition for each of the calibration images through the sensor based on the influence degree and the ideal-environment-measurement data, and also generating the viewing-environment-estimation data based on the darkroom-condition-estimation data and the ambient light data.

18. The image processing method as defined in claim 17, wherein the ambient light data, the darkroom-condition-estimation data and the viewing-environment-estimation data are represented by XYZ tristimulus values, the method further comprising generating the viewing-environment-estimation data by adding each of X-, Y- and Z-values in the ambient light data to each of X-, Y- and Z-values in the darkroom-condition-estimation data.

* * * * *